Dec. 4, 1974   W. P. MENASHI ET AL   3,777,009
METHOD FOR DIRECT MELT SYNTHESIS OF INTERMETALLIC COMPOUNDS
Filed Aug. 5, 1971   5 Sheets-Sheet 1

Wilson P. Menashi
Joseph F. Wenckus
Roger A. Castonguay
INVENTORS

BY *Bernie A. Leyper*
Attorney

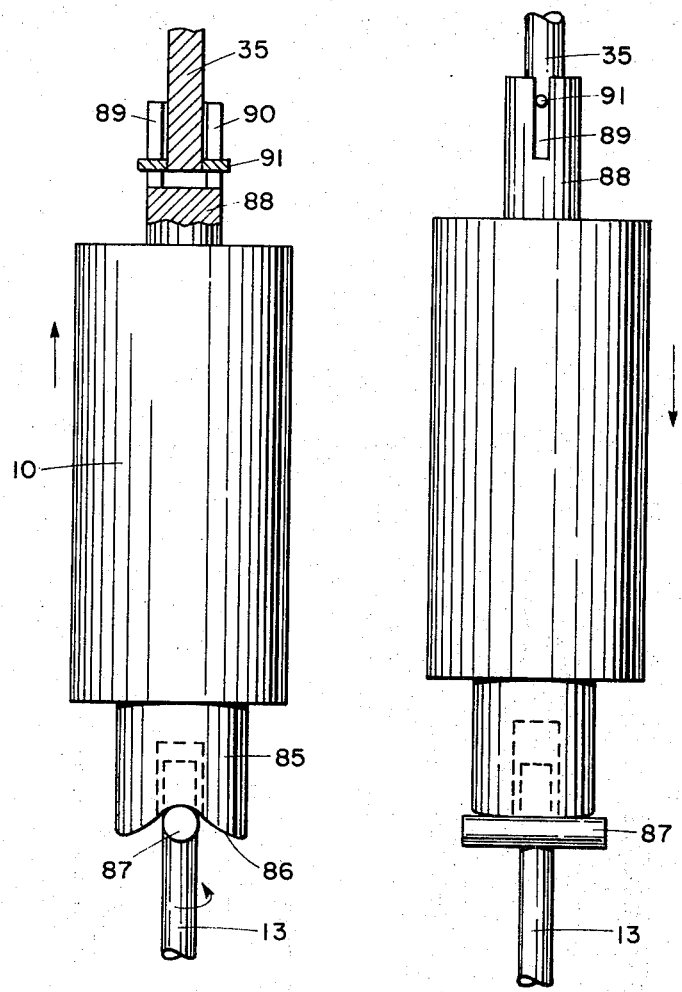

United States Patent Office 3,777,009
Patented Dec. 4, 1973

3,777,009
METHOD FOR DIRECT MELT SYNTHESIS OF INTERMETALLIC COMPOUNDS
Wilson P. Menashi, Lexington, Joseph F. Wenckus, Needham, and Roger A. Castonguay, Salem, Mass., assignors to Arthur D. Litttle, Inc., Cambridge, Mass.
Filed Aug. 5, 1971, Ser. No. 169,315
Int. Cl. C01b 19/00; C22c 7/00
U.S. Cl. 423—508                  16 Claims

ABSTRACT OF THE DISCLOSURE

Method and apparatus for the melt synthesis of Group III–V, mixed III–V, II–VI, II–IV–VI and II–III–compounds, at least one of the components forming the compounds being highly volatile under the conditions of synthesis. The metal components are placed in a reaction vessel which is sealed by a liquid selant in combination with a mechanical seal prior to heating the reactants to a temperature at which one or more of the reactants develops an appreciable vapor pressure. The atmosphere surrounding the reaction vessel is pressurized to a pressure above the maximum vapor pressure developed by the reactants during the melt synthesis which is accomplished by heating the reactants. The combination of mechanical and liquid seal is of a character to permit diffusion by high-pressure gas through it.

This invention relates to the synthesis of intermetallic compounds and the like and particularly to the Group III–V, Group II–VI and Group II–IV–VI intermetallic compounds, at least one component of which has a relatively high vapor pressure at elevated temperatures.

Although the term "intermetallic" is used throughout this description for convenience in referring to the products of the method of this invention, it is to be understood that this term as used hereinafter is meant to include compounds formed of metals and noncondensable reactants such as nitrogen and hydrogen as well. Since intermetallic compounds which are formed of one or more metal components having appreciable vapor pressures at elevated temperatures are commonly the most difficult to produce, the description to follow will be in terms of the synthesis of this type of intermetallic compounds. The method of this invention is, however, equally applicable to the synthesis of those intermetallic compounds, the preparation of which does not present the problem of component vapor pressure. It is also within the scope of this invention to apply this method of intermetallic compound synthesis to the forming of other ternary and to quaternary compounds, to mixed Group III–V compounds as well as to Group II–III–V compounds and the like.

During the past decade there has developed a growing interest in various uses for the Group III–V, Group II–VI and Group II–IV–VI intermetallic compounds because of their unique quantum-electronic properties. Thus these materials may be used as the detector elements in infrared detectors, as light-emitting diodes, as infrared window elements, and in Gunn diodes and Hall generators. Exemplary of the Group III–V intermetallics are those formed by reacting one or more of such Group III elements as gallium and indium with one or more of such Group V elements as phosphorous, arsenic and antimony. Exemplary of the Group II–VI intermetallics are those formed by reacting one or more of such Group II elements as zinc, cadmium and mercury with one or more of such Group VI elements as sulfur, selenium and tellurium. Mercury-cadmium-telluride, lead-tin-telluride and lead-tin-sellenide may be cited as examples of ternary systems formed of Group II–IV–VI compounds. A number of various dopants may also be added to these intermetallic compounds. Because the quantum-electronic properties of any one intermetallic compound depend upon the ratio of the various elemental components making up the compound, it is very important to be able accurately to control these ratios and to be able to reproduce them from batch to batch.

Many of these elemental components have very high vapor pressures at elevated temperatures both in their elemental state and in their combined state, a fact which has made the formation of these intermetallic compounds n their polycrystalline state exceedingly difficult and costly. For example, the vapor pressure of arsenic or phosphorus over molten GaAs (M.P. 1270° C.) or GaP (M.P. 1470° C.) is one atmosphere and 35 atmospheres, respectively. The vapor pressure of mercury over $Hg_{(x)} Cd_{(1-x)}Te$ can be much higher, especially when the cadmium concentrations are relatively high with corresponding increase in melting point.

Although the principal difficulties of producing single crystals from the polycrystalline materials such as the arsenides, phosphides, tellurides, selenides and the like have been largely overcome by use of liquid-encapsulated crystal growing techniques, the excessive cost of the polycrystalline intermetallics has materially hindered single crystal manufacture and use.

The present, most acceptable method for synthesizing a number of the binary intermetallic compounds in polycrystalline form for single crystal growing is what may be termed the horizontal Bridgman technique in which the components are combined using vapor/liquid-phase reactions and then horizontally zone-refined to produce and ingot which is subsequently cleaned and etched. For example, polycrystalline GaP production involves the reaction of P or $PH_3$ vapor passing over molten gallium which results in a sponge-like GaP mass which generally contains excess gallium.

The ternary mercury-cadmium-telluride compound is at present produced by a very slow, controlled reaction of the elements in an evacuated quartz ampoule. The reaction must be carried out very slowly with continuous rocking of the ampoule to prevent overheating and vaporizing the mercury which could cause the ampoule to burst. Typical reaction cycles require about 60 to 80 hours to form the compound. Thus, producing the intermetallic compounds by these prior art methods is time consuming and expensive. Moreover, the quality of the ingot is difficult to control and it is generally necessary to use an excess of the volatile component. Finally, the process demands the use of very small quantities of reactants and results in very small ingots.

In a copending application Ser. No. 46,242 filed June 15, 1970, in the names of John S. Haggerty and Joseph F. Wenckus, now U.S. Pat. 3,704,093 and assigned to the same assignee as this application, there is described and claimed an improved method for synthesizing intermetallic compounds. By this method the reactants are placed in an open crucible and an encapsulant such as $B_2O_3$ is placed on top of them. The crucible is placed within a vessel which is then pressurized to a level equal to or above the highest vapor pressure attained by the volatile component during the reaction. The crucible is gradually moved into a heating zone, e.g., within RF coils, in a manner to first heat and melt the encapsulant and then the reactants. Through the use of the molten encapsulant and the surrounding elevated pressure, it is possible by this method to form intermetallic compounds, in particular those which form at the lower temperatures. However, since the encapsulant is in physical contact with the reactants (over and around them) it is not possible for some reactant systems to get sufficient heat into the encapsulant before the vapor pressure of the volatile component becomes sufficiently high to result in some loss of that component to the reactant system. In some instances one of the reactants in molten form may have a specific gravity which is materially less than that of the molten encapsulant in which case a physical inversion may take place resulting in the molten reactant becoming the top layer separated from the other reactant by a layer of encapsulant.

It would therefore be desirable to have available an improved method and apparatus for forming intermetallic compounds, at least one reactant of which is volatile at elevated temperatures, wherein an encapsulant was not necessary and by which the compounds can be formed in a relatively short period of time.

It is therefore a primary object of this invention to provide an improved method for direct melt synthesis of intermetallic compounds which contain at least one component which is volatile at elevated temperatures, and particularly Group III–V, Group II–VI and Group II–IV–VI intermetallics. An additional object is to provide a method which permits accurate control of the composition of the compound and the reproducibility of compositions. It is another object to provide a method of the character described which is less expensive and less time-consuming than the prior art methods and which does not require an excess of the volatile component, does not use an encapsulant and is free from any external contamination. It is still another object to provide such a method which lends itself to mixing during reaction and to relatively large-batch production of such inter-metallic compounds; and which makes possible the incorporation of the melt synthesis directly into a crystal growing procedure without cooling and remelting of the intermetallic compound.

It is another primary object of this invention to provide apparatus for carrying out the direct melt synthesis of intermetallic compounds. An additional object is to provide apparatus of the character described which eliminates the possibility of contamination, provides for mixing during the formation of the compound, and makes possible relatively rapid, large-scale batch production of intermetallic compounds of accurately controlled and reproducible compositions. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

In brief, in the method of this invention the reaction of the elemental components is carried out in a reaction vessel which is sealed mechanically as well as with a molten liquid sealant. The use of the mechanical seal materially reduces or eliminates the loss of vapors at temperatures below the melting point of the sealant; while the molten liquid sealant reinforces the mechanical seal at temperatures above the melting point of the sealant. Since the molten liquid sealant remains on the outside of the reaction vessel, the possibility of contaminating the reactants or the resulting compound is reduced. The reaction vessel is heated gradually from top to bottom while it is under sufficient pressure to minimize or eliminate any pressure differential across the walls of the reaction vessel, thus preventing either explosion or implosion and eliminating the need for a small heavy-walled vessel. Stirring or gentle shaking of the reaction vessel is possible for mixing of the reactants and the reaction vessel may be designed to attain directional solidification of the molten reaction product making it possible in some cases to obtain directly single crystals of the intermetallic compound.

For a fuller understanding of the nature and objects of the invention, reference should be had to the following detailed description taken in connection with the accompanying drawings in which FIG. 1 is a cross section of one embodiment of a reaction vessel of this invention showing both mechanical and liquid seals;

FIGS. 8 and 9 show means for gently shaking the reaction vessel of FIG. 1 up and down to obtain mixing of the reactants.

Figure 1:
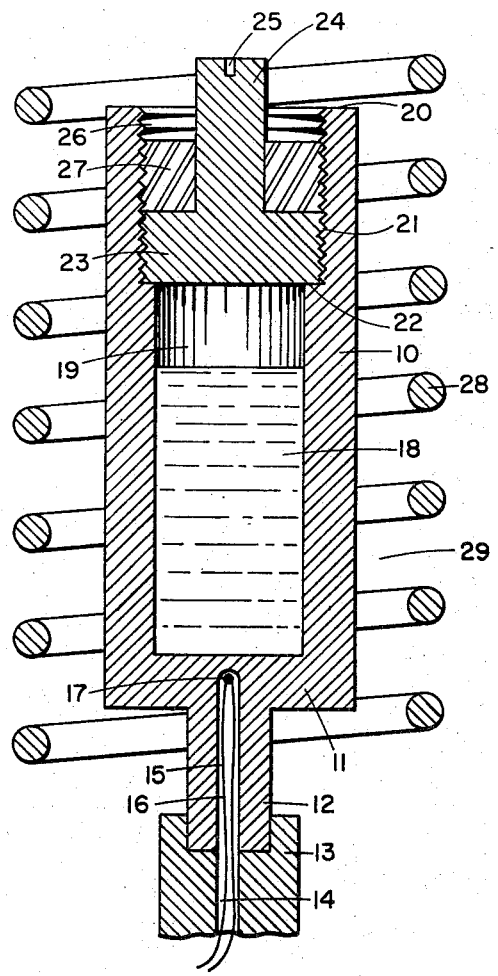

One embodiment of a reaction vessel suitable for carrying out the method of this invention is illustrated in cross section in FIG. 1. It is formed as a cylindrical enclosure 10 closed on the lower end with a bottom member 11 which has integral therewith a smaller diameter support section 12 suitable for positioning within, or otherwise attaching to, lower load-bearing rod 13 capable of being driven in a translation as well as rotational mode. Such a load-bearing rod and its associated driving means are described in U.S. Pat. 3,552,931. A passage 14 is drilled in load-bearing rod 13 and a similar in-line passage 15 is drilled into support section 12 and partly into the bottom member 11. These passages provide a channel for inserting thermocouple lead wires 16 which terminate in a thermocouple junction 17 for measuring the temperature of the molten reactants or reaction products 18 contained within the reaction chamber 19 defined within the reaction vessel.

The cylindrical enclosure 10 forming the reaction vessel is open on the upper end 20 to provide an upper access opening. The upper end has internal threads 21 which terminate in a shoulder 22. The reaction vessel is closed by means of a threaded plug 23 which has a centrally extending relative thick stem 24 which may have a slot 25 for engagement with a screw driver or the like. When plug 23 is screwed all the way down into position, a peripheral ring of plug 23 engages shoulder 22 to form, with the threaded connection, a mechanical seal for the reaction vessel. Above plug 23 and occupying at least a portion of the annular channel 26 defined between the threaded wall and the plug stem 24 is a quantity of liquid sealant 27 which is usually a molten material such as molten $B_2O_3$.

Figure 2:
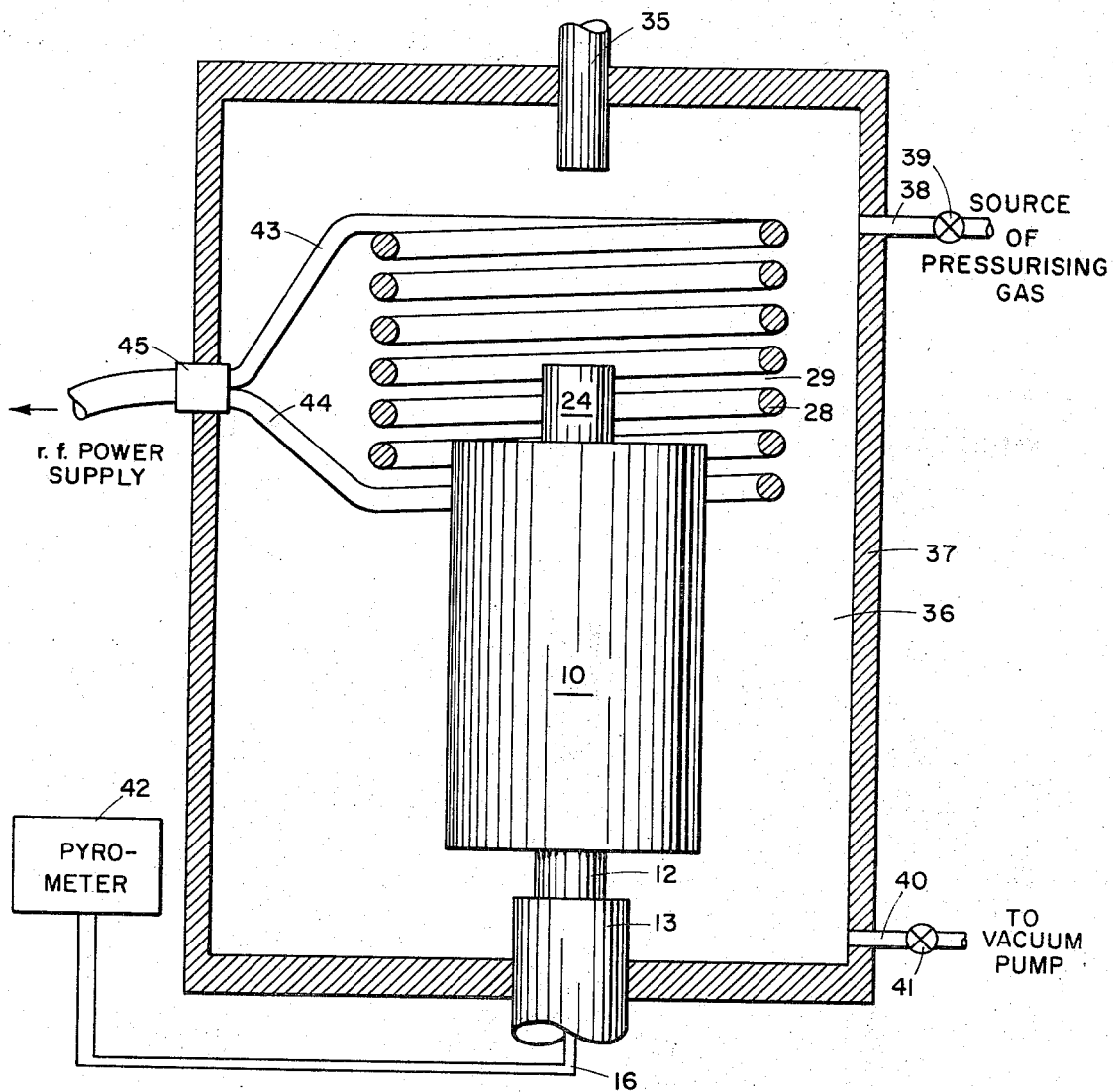
FIG. 2 is a somewhat diagrammatic cross section of the working volume of a pressure furnace with the reaction vessel in position to form the molten liquid seal.

FIG. 1 illustrates the reaction vessel in position for the actual melt synthesis, i.e., positioned entirely within an RF coil 28 defining a heating zone 29. FIG. 2 illustrates the reaction vessel within a pressurized chamber at the beginning of the melt synthesis. The actual melt synthesis is conveniently carried out in a pressure- and temperature-controlled furnace such as that described in a copending application Ser. No. 46,096 filed June 15, 1970, and assigned to the same assignee as the present application. The furnace described in Ser. No. 46,096 permits operations to be carried out therein at temperatures up to 4000° C. and pressures ranging from $10^{-5}$ torr to 100 atmospheres. It also provides for imparting translational and rotational motion to the lower load-bearing rod 13 as well as to an upper load-bearing rod 35 by driving means located externally of the working volume 36 shown schematically to be defined by an enclosure 37. Pressurizing gas is introduced through an inlet conduit 38, the fluid flow through which is controlled by valve 39. In a similar manner the working volume 36 is in communication with a vacuum pump through conduit 40, the fluid flow through which is controlled by valve 41. The thermocouple wires 16 are connected to a pyrometer 42, or other suitable temperature-sensing and measuring means; and the RF coil 28 is connected through leads 43 and 44 by way of a coupling 45 to a suitable RF power supply. A temperature- and pressure-controlled furnace such as that described in Ser. No. 46,096 provides all of the above-described auxiliary equipment which is not part of the apparatus of this invention but which does play an important role in describing the method of this invention.

In using the reaction vessel of FIG. 1, the weighed reactants are introduced into the cylindrical section 10 and it is then placed, along with plug 23, in a glove-box. The box is evacuated and then nitrogen or some other appropriate pressurizing gas introduced into the glove-box to a pressure of about one atmosphere. The plug 23 is then screwed into the threaded section to make a tight mechanical seal with the shoulder 22, thus essentially retaining the pressurizing gas within the reaction vessel. The assembled vessel is removed from the glove-box, a quantity of sealant (normally in solid form) is placed in the annular volume 26 and the entire assembly is positioned on the load-bearing rod 13 located within the working chamber of the furnace or other suitable pressurizable device. The furnace is then pressurized with the same gas introduced into the reaction vessel until the pressure surrounding the reaction vessel is equal to or greater than the maximum vapor pressure to be developed by the volatile component at any time during the melt synthesis.

To begin the synthesis the reaction vessel is positioned as shown in FIG. 2—that is only that upper portion of the vessel which holds the sealant is brought within the heating zone, e.g., within the RF coils 28. The vessel is maintained in this position until the sealant is molten. A small amount of the sealant may work its way into the threads between the plug and the vessel wall. However, even if it does penetrate to the bottom of plug 23, its entry into chamber 19 will be blocked by the seal around shoulder 22. Because the sealant is positioned outside the reaction chamber 19 and is held above the level of the reactants within the chamber, it is possible to melt it and derive the benefit of its sealing ability prior to the heating of the reactants to a temperature where at least one of them begins to develop an appreciable vapor pressure. This in turn means that the mechanical and liquid seals plus the pressurized gas around the vessel are most efficiently used to prevent leakage of the volatile component from the reaction chamber and that there can be no contamination of the reaction product by the liquid sealant. These facts in turn mean that the composition and purity of the final intermetallic compound can be accurately controlled and reproduced.

When the sealant 27 is molten, the lower load-bearing rod 13 is gradually driven upwardly to slowly bring the reaction vessel in the heating zone 29 to heat and then melt the reactants. The temperature of the material within the reaction vessel is continually monitored by means of the thermocouple pyrometer and the load-bearing rod is driven at a speed so that the temperature of the reactants increases at the desired rate, for example at about 100° C. per hour. As the reactants within the vessel are heated the volatile reactant, or reactants, begins to develop an appreciable vapor pressure. The pressures within the vessel and around it are equalized by diffusion of gases through the seals since they are not of a quality to handle the pressures encountered. This equalization of pressures means that the dangers of explosions or implosions are minimized. It also means that the reaction vessel walls do not have to be able to withstand large pressure differentials. Thus little, if any, consideration need be given to the use of a suitable ratio of vessel wall thickness to reaction chamber volume; and relatively large batches of material may be handled. As the heating is continued and finally when the reaction takes place a small amount of the volatile component, e.g., mercury, arsenic or phosphorus may be lost to the surrounding atmosphere as evidenced by a slight bubbling of the liquid sealant. However, the actual quantity is small and may be compensated for in determining the quantities of reactants used. If the same rate of heating is used for a series of runs to produce the same intermetallic compound, then the composition of the final products should be reproducibly accurate.

Since it is only necessary that there be relative motion between the reaction vessel and heating zone, it is also within the scope of this invention to move the heating means defining the heating zone in a translational mode while maintaining the reaction vessel stationary or rotating it only.

Figure 5:
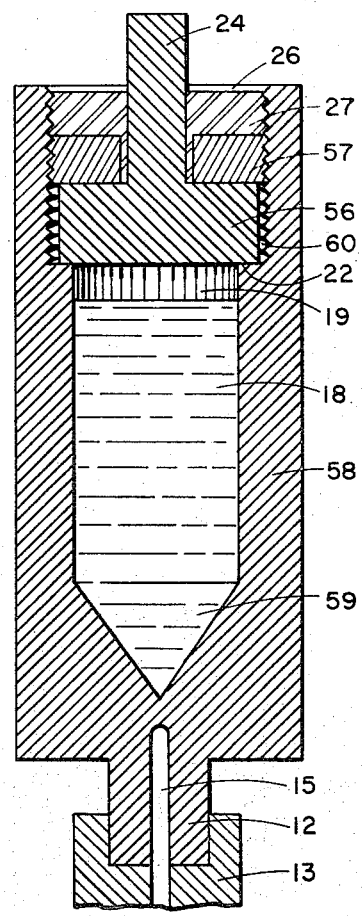
FIG. 5 is a cross section of a fourth embodiment of the reaction vessel illustrating a different form of mechanical seal and an contoured interior to obtain directional cooling of the molten reaction product.

The reaction within the vessel is monitored by tracing the measured temperature on a predetermined phase diagram chart which is used to indicate completion of the reaction. It is usually desirable to hold the melt at the reaction temperature for a period of time, e.g., from about one-half to one hour, to ensure completion of the reaction. If a polycrystalline product is desired, then the melt product can be quenched relatively rapidly by turning off the heating means, e.g., the power to RF coils. In some cases it may be desirable to repeat the heating and cooling cycle to ensure complete reaction. The product is removed as an ingot from the reaction vessel. Alternatively, the melt may be directionally solidified using the Bridgman-Stockbarger method to produce a single crystal or a large polycrystal ingot. A reaction vessel suitable for this is illustrated in FIG. 5.

Figure 3:
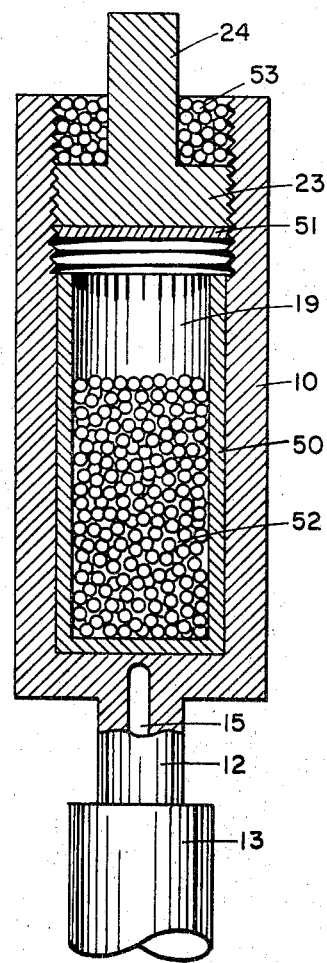
FIG. 3 is a cross section of a second embodiment of the reaction vessel of this invention having an inert lining and illustrating the assembly of the reactants and sealants in the vessel prior to heating.

The reaction vessel may be constructed from a number of different materials including graphite, boron nitride, quartz, high-melting metals such as molybdenum and tantalum, and refractories such as alumina, zirconia and titania. If RF heating is used, then a portion of the reaction vessel can be constructed of graphite to serve as a susceptor for the RF radiation. However, if the reactants, or the reaction product, are of a nature to react with or be contaminated by graphite, then the vessel and plug may be lined with an inert material as shown in FIG. 3. Heating means other than an RF coil may be used. Such heating means include, but are not limited to, resistance heaters, lasers, and the like.

In FIG. 3, wherein like reference numerals are used to refer to like components, the inner walls defining the reaction chamber 19 are lined with a liner 50 formed of a suitable inert material; and the end 51 of plug 23 is also lined or suitably coated. Although sleeve-type liners are illustrated in FIG. 3, the liners may be appropriately thick coatings applied by painting, spraying and the like. FIG. 3 also illustrates the assembling of the reaction vessel, showing the solid reactants 52 within the vessel and the solid sealant material 53 placed in position on and around the plug.

Figure 4:
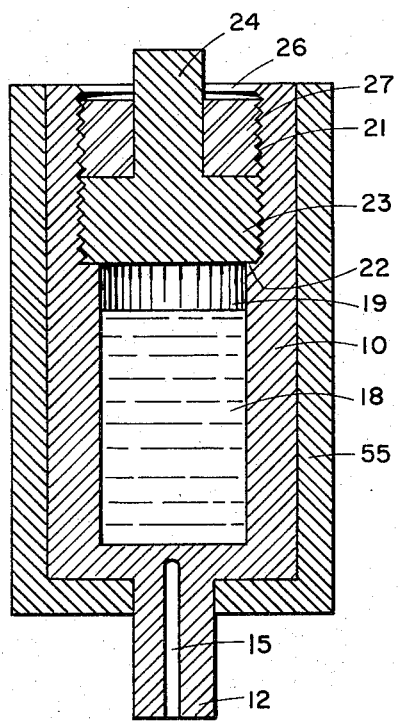
FIG. 4 is a cross section of a third embodiment of the reaction vessel illustrating a composite vessel formed as an outer graphite susceptor portion and an inner nongraphite portion.

The reaction vessel of FIG. 4 is a modification of that of FIG. 3. In the vessel of FIG. 4, the reaction vessel is formed of a material other than graphite and it is set in a graphite sheath 55. FIG. 5 illustrates two further modifications where the plug is not threaded and wherein the reaction chamber is shaped to achieve directional cooling. The plug 56 is cut without threads and a threaded ring 57 is used to force the plug to contact shoulder 22. The liquid sealant in such a case may penetrate into the annular passage 60 defined between the inner wall of ring 57 and the plug stem 24. The main cylindrical enclosure 58 of the reaction vessel is constructed to define a conically-shaped bottom 59 in the reaction chamber. The molten reaction product may be cooled by gradually withdrawing the reaction vessel from the heating zone so that cooling and solidification begins at the bottom tip of the cone. This achieves directional solidification by a form of the Bridgman Stockbarger method.

Figure 6:
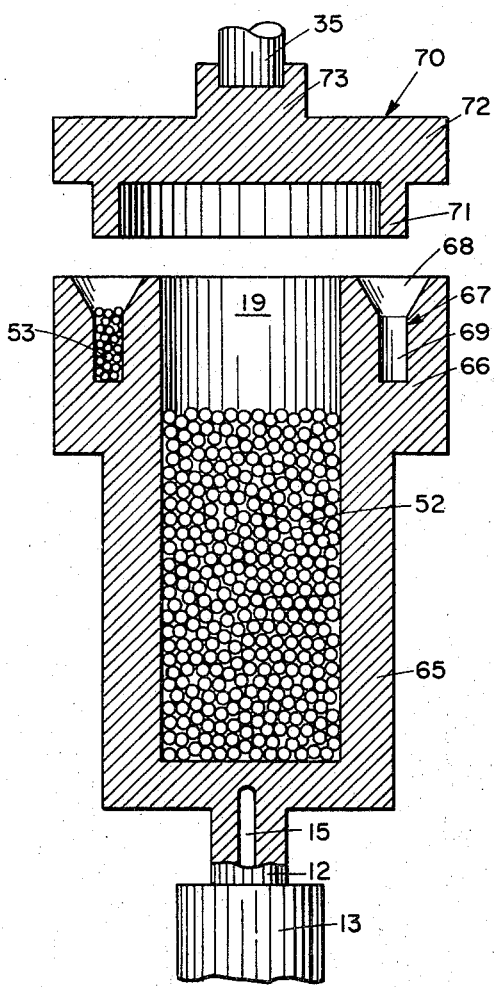
FIG. 6 is a cross section of a fifth embodiment of the reaction vessel wherein the molten liquid sealant provides the major sealing capacity.
Figure 7:
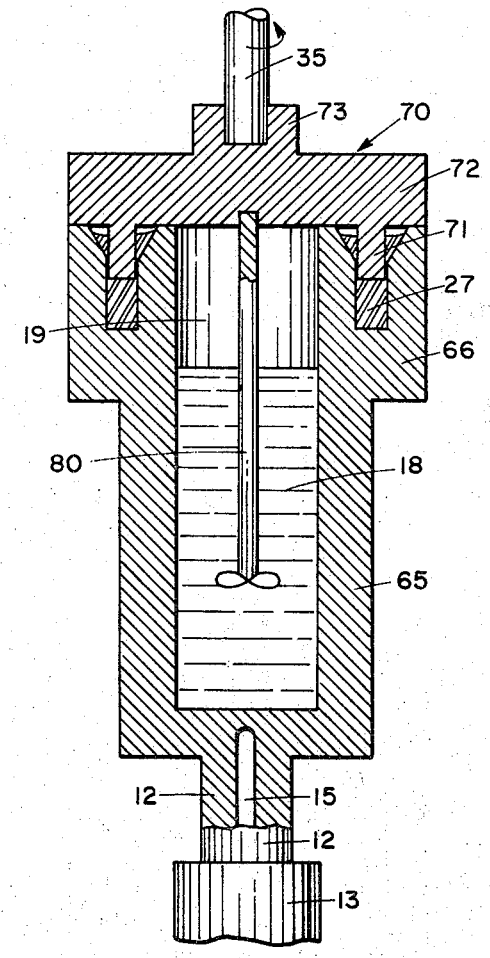
FIG. 7 illustrates the incorporation of a stirrer into the reaction vessel of FIG. 6.

The embodiments of the reaction vessel illustrated in FIGS. 6 and 7 provide for a somewhat different arrangement to achieve mechanical and liquid seals. The main body of the vessel is formed of a cylindrical section 65 which is integral with an upper thick-walled section 66. This section 66 has an annular sealant channel 67 cut into it. This channel has an upper section 68 with a frustoconical cross section and a lower section 69 with a rectangular cross section. The reaction vessel is sealed with a lid 70 which is formed of a ring section 71, the wall of which has a thickness corresponding to the width of channel section 69, and a cover member 72. The cover member 72 has a centrally positioned attachment collar member 73 through which the lid is attached to an upper load-bearing rod 35 provided in the pressurizable furnace. Upper rod 35 may be driven to experience both translational and rotational motions. In using the reaction vessel of FIG. 6, the solid particles of sealant material 53 are placed into the sealing channel 67, the vessel is mounted on the lower rod 12 and the lid affixed to upper rod 35. The reaction vessel cannot be evacuated and then filled with a pressurizing gas in a glove-box such as described for the use of the vessel of FIG. 1 (or for FIGS. 3–5). However, evacuation and introduction of an atmosphere or so of pressurizing gas can readily be accomplished within the furnace volume (see FIG. 2). The lid may then be set to just rest on the sealant particles and heating begun so that the sealant melts. At this time upper rod 35 is moved downwardly to seat the lid firmly onto the reaction vessel. As the reaction vessel is moved upwardly into the heating zone, both of the rods 13 and 35 are moved at the same rate to maintain the firm contact. In the embodiment of FIGS. 6 and 7, the liquid seal provides the major part of the sealing. The sealant channel 67 should be of a sufficient depth to hold enough sealant so that it may provide the required sealing ability without reaching the top of the channel to spill into chamber 19.

FIG. 7 illustrates the reaction vessel of FIG. 6 equipped with a stirrer 80 which is affixed to the lid 72. Relative motion between the lid and the remaining part of the reaction vessel is then attained by rotating the upper rod 35 and the lid therewith. It is also, of course, possible to rotate the lower rod 13 rather than upper rod 35.

The reaction vessel of FIGS. 8 and 9 provides an alternative form of mixing, namely a gentle up and down motion. The vessel is essentially the same as is shown in FIG. 1, except that the lower support section 85 is contoured on the bottom to provide a cam surface 86 and the lower load-bearing rod 13 has a cam follower in the form of a horizontal bar 87. The plug stem 88 has two opposed slots 89 and 90 in which a pin 91, affixed to upper rod 35, to maintain alignment of the reaction vessel and prevent its rotation as it is moved up and down with the rotation of lower rod 13 and the engagement of cam follower rod 86 with cam surface 86. Mixing by whatever means employed may be continuous or periodic.

It is, of course, within the scope of this invention to combine features of the reaction vessels illustrated, for example to use the sealing means of FIG. 1 with the vessel of FIG. 5; to use the sealing means of FIG. 5 with the mixing means of FIGS. 8 and 9, etc.

A number of different sealants may be used. These include, but are not limited to boric oxide ($B_2O_3$), barium oxide and these oxides in admixture with barium chloride and sodium fluoride, potassium chloride, sodium chloride and the like. The density of the molten sealant is not important, nor is its reactivity with the metal reactants or resulting reaction product important. The sealant should, however, be a compound which melts below the reaction temperature and which has a very low vapor pressure over the temperature range at which it is used.

The following example, which is meant to be illustrative and not limiting, further describes the method of this invention. A mixture of 103 grams of mercury, 18 grams of cadmium and 102 grams of tellurium was loaded into a graphite crucible constructed as shown in FIG. 1. The preliminary mechanical sealing was accomplished in a glove-box after the box was evacuated and filled to about one atmosphere of nitrogen. The sealed reaction vessel was then transferred to a pressure- and temperature-controlled furnace constructed as described in Ser. No. 46,096. The furnace was pressurized with nitrogen to 1150 p.s.i.g. and heating was begun by first melting the $B_2O_3$ used as a liquid sealant. After the $B_2O_3$ was melted, heating was continued, by moving the vessel upwardly through an RF coil, at a rate of about 100° C./hour until the temperature within the vessel was raised to something over 810° C., the calculated reaction temperature. The charge was held at that temperature for about 20 minutes and then cooled rapidly by shutting off the power to the RF coil. A polycrystalline ingot 1⅛" in diameter and 1⅝" long was obtained. The original mixture of reactants was formed to produce $Hg_{0.8}Cd_{0.2}Te$, taking into account the need for excess mercury, the volatile component.

In addition to providing reactants in solid form, the pressurizing gas may itself be a reactant, e.g., nitrogen to form nitrides. Any suitable dopants may be added to the reactants.

By sealing the reaction vessel, both mechanically and with a liquid sealant, in a manner to permit the diffusion of high-pressure gases through the seals it is possible to maintain the pressures within and outside of the reaction vessel at essentially the same level, thus eliminating the need for a thick-walled vessel and thus permitting relatively large batches to be handled. By using a liquid sealant instead of an encapsulant and by maintaining the sealant above the reactants and out of contact with them it is possible to make full use of the sealing properties of the sealant before any appreciable amount of vapor pressure is developed by one or more of the reactants and to prevent any contamination of the reaction product.

It will thus be seen that the objects set forth above; among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limting sense.

We claim:

1. A method for the direct melt synthesis of Group III–V, mixed III–V, II–VI, II–IV–VI and II–III–IV compounds in which at least one element is volatile under conditions of synthesis, comprising the steps of
    (a) providing all reactants in a reaction chamber of a reaction vessel;
    (b) forming both a mechanical seal and a liquid seal for said reaction vessel prior to heating said reactants to a temperature at which one or more of said reactants develops an appreciable vapor pressure, said mechanical and liquid seals in combination being of a character such that high-pressure gases may diffuse through them, the sealant forming said liquid seal remaining outside said reaction chamber;
    (c) pressurizing the atmosphere surrounding said reaction vessel to a pressure above the maximum vapor pressure developed by said reactanats at any time in the course of forming said compound; and
    (d) heating said reactants to a temperature and for a time sufficient to effect their reaction and to form said compound.

2. A method in accordance with claim 1 wherein the step of providing a liquid seal comprises melting a solid sealant positioned to flow in contact with a portion of said mechanical seal.

3. A method in accordance with claim 2 wherein said sealant is molten $B_2O_3$.

4. A method in accordance with claim 1 including the step of introducing approximately one atmosphere of a pressurizing gas into said reaction vessel prior to said forming of said mechanical and liquid seals.

5. A method in accordance with claim 1 wherein said liquid seal is formed before said mechanical seal.

6. A method in accordance with claim 1 wherein the step of heating said reactants comprises effecting relative translational motion between said reaction vessel and a heating zone.

7. A method in accordance with claim 6 wherein said reaction vessel is moved upwardly while said heating zone is maintained stationary.

8. A method in accordance with claim 1 including the step of mixing the reactants during the synthesis.

9. A method in accordance with claim 8 wherein said mixing comprises stirring.

10. A method in accordance with claim 8 wherein said mixing comprises imparting a gentle up and down motion to said reaction vessel.

11. A method in accordance with claim 1 including the step of directionally cooling the molten compound formed.

12. A method in accordance with claim 1 wherein the gas used in pressurizing the atmosphere surrounding said reaction vessel is a reactant required in the formation of said intermetallic compound.

13. A method for the direct melt synthesis of Group III–V, mixed III–V, II–VI, II–IV–VI and II–III–V compounds in which at least one element is volatile under conditions of synthesis, comprising the steps of
(a) providing all reactants in a reaction chamber of a reaction vessel;
(b) replacing the air over said reactants in said chamber by about one atmosphere of a gas;
(c) mechanically sealing said reaction vessel at its upper end to entrap said gas therein;
(d) pressurizing the atmosphere surrounding said reaction vessel with said gas to a pressure above the maximum vapor pressure developed by said reactants at any time in the course of forming said compound;
(e) melting a solid sealant positioned to flow in its molten state in contact with a portion of said mechanical seal thereby to form a liquid seal in conjunction with said mechanical seal, said melting of said sealant being effected by introducing said upper end of said reaction vessel in a heating zone thereby to form a liquid seal while maintaining that portion of said reaction vessel containing said reactants at a temperature below that at which one or more of said reactants develops an appreciable vapor pressure, the combination of said mechanical and liquid seals being of a character to permit diffusion of high-pressure gas therethrough, the sealant forming said liquid seal remaining outside said reaction chamber; and
(f) subsequent to the formation of said liquid seal, effecting relative motion at a predetermined rate between said reaction vessel and said heating zone thereby to heat said reactants at a temperature and for a time sufficient to effect their reaction and to form said compound in the molten state.

14. A method in accordance with claim 13 wherein the sealant is $B_2O_3$.

15. A method in accordance with claim 13 wherein the step of effecting relative motion between said reaction vessel and said heating zone comprises moving said reaction vessel up into said heating zone.

16. A method in accordance with claim 13 including the step of directionally cooling the molten reaction product compound.

References Cited
UNITED STATES PATENTS

| | | | |
|---|---|---|---|
| 3,649,193 | 3/1972 | Deyris | 23—204 R |
| 2,832,672 | 4/1958 | Fetterley et al. | 23—204 III–V |
| 3,642,443 | 2/1972 | Blum et al. | 23—204 R |

OSCAR R. VERTIZ, Primary Examiner

H. S. MILLER, Assistant Examiner

U.S. Cl. X.R.

75—134 T; 252—62.3 GA; 423—561

UNITED STATES PATENT OFFICE
CERTIFICATE OF CORRECTION

Patent No. 3,777,009      Dated December 4, 1973

Inventor(s) Wilson P. Menashi, Joseph F. Wenckus and Roger A. Castonguay

It is certified that error appears in the above-identified patent and that said Letters Patent are hereby corrected as shown below:

Amend the issue date on the five sheets of drawings to read December 4, 1973.

Signed and sealed this 16th day of April 1974.

(SEAL)
Attest:

EDWARD M. FLETCHER, JR.
Attesting Officer

C. MARSHALL DANN
Commissioner of Patents